U S007808511B2

(12) United States Patent (10) Patent No.: US 7,808,511 B2
Opala et al. (45) Date of Patent: Oct. 5, 2010

(54) METHOD AND SYSTEM FOR STREAMING DOCUMENTS, E-MAIL ATTACHMENTS AND MAPS TO WIRELESS DEVICES

(75) Inventors: Andrew Opala, Mississauga (CA); Rudy Ziegler, Toronto (CA)

(73) Assignee: iSee Media, Inc., Concord, Ontario (CA)

( * ) Notice: Subject to any disclaimer, the term of this patent is extended or adjusted under 35 U.S.C. 154(b) by 0 days.

(21) Appl. No.: 12/431,318

(22) Filed: Apr. 28, 2009

(65) Prior Publication Data

US 2009/0262133 A1 Oct. 22, 2009

Related U.S. Application Data

(62) Division of application No. 10/988,222, filed on Nov. 12, 2004.

(51) Int. Cl.
G09G 5/00 (2006.01)
G06T 13/00 (2006.01)
G06T 17/00 (2006.01)

(52) U.S. Cl. .................. 345/619; 345/428; 345/473; 345/474

(58) Field of Classification Search .................. 345/473, 345/474, 428, 619
See application file for complete search history.

(56) References Cited

U.S. PATENT DOCUMENTS

| | | | |
|---|---|---|---|
| 4,593,278 A | 6/1986 | Koos, Jr. et al. | |
| 5,012,433 A | 4/1991 | Callahan et al. | |
| 5,329,613 A | 7/1994 | Brase et al. | |
| 5,524,186 A | 6/1996 | Campbell | |
| 5,542,052 A | 7/1996 | Deutsch et al. | |
| 5,638,523 A | 6/1997 | Mullet et al. | |
| 5,856,829 A | 1/1999 | Gray, III et al. | |
| 5,905,820 A | 5/1999 | Cushman et al. | |
| 5,926,188 A | 7/1999 | Kawamoto et al. | |
| 6,075,875 A | 6/2000 | Gu | |
| 6,326,964 B1 | 12/2001 | Snyder et al. | |
| 6,389,168 B2 * | 5/2002 | Altunbasak et al. | ......... 382/224 |
| 6,438,575 B1 | 8/2002 | Khan et al. | |
| 6,523,024 B1 | 2/2003 | Yajima et al. | |
| 6,700,589 B1 | 3/2004 | Canelones et al. | |
| 6,738,073 B2 | 5/2004 | Park et al. | |
| 7,283,135 B1 | 10/2007 | Coté et al. | |
| 2002/0158881 A1 | 10/2002 | van Welzen | |
| 2003/0011623 A1 | 1/2003 | Dermer | |
| 2003/0077002 A1 | 4/2003 | Silverstein et al. | |

(Continued)

FOREIGN PATENT DOCUMENTS

KR 2002040953 A 5/2002

*Primary Examiner*—Ulka Chauhan
*Assistant Examiner*—Jeffrey J Chow
(74) *Attorney, Agent, or Firm*—Greer, Burns & Crain, Ltd.

(57) ABSTRACT

A method for pre-processing a vector image, including: receiving data for a vector image, the vector image data including a list of descriptions of global vector objects that can be rasterized for display at arbitrary levels of resolution; for each local region from among a plurality of local rectangular regions of the vector image, the local rectangular regions being associated with levels of resolution, determining local vector objects that correspond to intersections of global vector objects with such local region; and for each local region from among the plurality of local rectangular regions, storing descriptions of its local vector objects within a computer memory.

20 Claims, 8 Drawing Sheets

U.S. PATENT DOCUMENTS

| | | |
|---|---|---|
| 2003/0112254 A1 | 6/2003 | Ishihara |
| 2003/0156124 A1 | 8/2003 | Good et al. |
| 2004/0139080 A1 | 7/2004 | Schmidt et al. |
| 2004/0257608 A1 | 12/2004 | Tipimeni |
| 2006/0055693 A1 | 3/2006 | Sylthe et al. |
| 2006/0218587 A1 | 9/2006 | Kelts |

* cited by examiner

METHOD AND SYSTEM FOR STREAMING DOCUMENTS, E-MAIL ATTACHMENTS AND MAPS TO WIRELESS DEVICES

RELATED APPLICATION

This is a divisional of application Ser. No. 10/988,222, filed Nov. 12, 2004, and Applicants claim priority under 35 USC §120 from the above-identified parent application.

FIELD OF THE INVENTION

The present invention relates to streaming of vector images, including documents, e-mail attachments and maps, to wireless devices.

BACKGROUND OF THE INVENTION

Internet streaming is the art of transmitting digital media in such a way that the media can be played at the receiver side as it is being received, without the requirement of saving a media file to disk. Streaming enables live broadcast in the digital world, similar to radio and television broadcasts in the analog world.

Conventionally, streaming has been used for time-based media, including digital audio and digital video. A user can listen to music generated from audio data and watch movies generated from video data, as the data is being received by his client computer from a server computer, without the need to save an audio file or a video file on the client computer. As additional data is received at the client, the music and video being played advance in time.

Image streaming is a new paradigm for non-time based media, useful for images and other media that can be interactively viewed and that require large amounts of data for storage. Although an image is a single frame, and not a time-ordered sequence, nevertheless there is great advantage in being able to interactively view the image as image data is being received, without the need to save the image data into a file.

A high-quality raster image generally cannot be displayed at its full resolution within a computer display screen. Instead, either a low-resolution version of the image can be displayed in full, or else a high-resolution version can be displayed in part. A user can interactively view different portions of the image by zooming in to a smaller portion of the image at a higher resolution, by zooming out to a larger portion of the image at a lower resolution, or by panning left, right, up and down within a fixed resolution.

Image streaming involves sending image data from a server computer to a client computer in response to a user's interactive viewing requests, in such a way that the client has the necessary data to display the currently requested portion of the image at the currently requested resolution. In distinction from audio and video streaming, which generally push data to the client in a time sequential order, image streaming generally pulls data from the server in an "on demand" order, based on individual user navigation. Thus, while a first user may navigate through the image in his own sequential order, a second user may navigate in a different order. In each case, "just enough data" is streamed to each user in order to satisfy each user's interactive requests.

For raster images, image streaming is implemented by generating versions of a raster image at various resolutions, and partitioning the image into rectangular local image tile regions at each generated resolution. A user request for a specific portion of the image at a specific resolution is satisfied by identifying and transmitting one or more appropriate local image tile regions.

Image streaming can be implemented using various architectures, including server-side rendering, client-side rendering, and hybrid server-side and client-side rendering. Server-side rendering requires the server to assemble together the appropriate local image tile regions, and crop and re-scale the assembled image as appropriate, to generate a single JPEG image, for each interactive user request. An advantage of server-side rendering is that image streaming is enabled for any client computer that has a conventional web browser running; i.e., it does not require special purpose software on the client side. Client-side rendering shifts the image processing burden from the server to the client. The appropriate local image tile regions are transmitted from the server to the client as raw unprocessed data, and the client does the processing work to assemble the local image tile regions. An advantage of client-side rendering is faster performance at the client.

A significant distinction between conventional time-based audio and video streaming and between non-time based image streaming, is recurrence of data that is rendered. Specifically, audio and video sequences are generally rendered in a one-pass forward play order, and the same data is generally not rendered more than once. Image navigation, however, is characteristically recurrent. While zooming in and out, and panning left, right, up and down, a user often returns to the same data over and over again. Typically, the same local image tile regions are rendered multiple times while a user is navigating through an image. As such, image streaming performance benefits greatly from tile caching.

U.S. Pat. No. 5,968,120 to Guedalia describes image streaming by transmitting local image tiles. U.S. Pat. Nos. 6,121,970 and 6,356,283 to Guedalia describe embodiments of server-side image streaming that operate by modifying references to image files within HTML pages, using the Internet Imaging Protocol.

U.S. Pat. No. 6,536,043 to Guedalia and U.S. Pat. No. 6,721,952 to Guedalia et al. describe progressive image streaming, in which successive chunks of image data are transmitted, each successive chunk serving to upgrade the quality of the rendered image.

U.S. Pat. No. 6,745,226 to Guedalia describes a push-pull method and system for transmitting image data, in which data for a low quality version of an image is pushed to a user's desktop, and data for upgrading the quality of the image is pulled on demand by a user at will.

With the advent of wireless devices and the cost of transmission time for large digital files, it has become more practical to distribute vector images for large graphics, instead of raster images. Vector images are generally comprised of vector primitives, also referred to as vector objects, such as points, lines and areas, and raster images are generally comprised of arrays of pixel color values. Vector objects are typically specified by attributes, including inter alia attributes for a color, a style and one or more control points. As such, for large graphics, vector image files are typically much smaller than their counterpart raster image files.

Moreover, vector images are significant for maps that can be viewed at a variety of scales, such as maps displayed by GPS systems.

Vector images are also significant for rich text format documents, since true type fonts are generally represented as vector objects. Many of today's wireless devices, such as cellular phones, do not have the capability to render rich text documents, such as WORD and PDF documents. Instead, the documents are converted to plain ASCII text. For example, if a user receives e-mail with a WORD document attachment on his cell phone, the WORD document is generally displayed in plain text.

The lack of capability to render rich text documents in wireless devices is not due to inherent limitations in wireless communication or wireless device processors. Instead, the primary reason for not rendering rich text documents is the drawback of the download time required to receive such a document over the air and save it to memory. Clearly image streaming should be used to mitigate such drawback. Image streaming should enable a client device to render portions of a document on demand, as data for the document is being received at the client, without the need to save the entire document to memory.

However, conventional image streaming applications only stream raster images, and not vector images. Using conventional technology, vector images have to be first converted to raster images before they can be streamed from a server computer to a client computer. Such conversion clearly eliminates the size advantage of vector images over raster images.

There is thus a need for an application that streams vector images without conversion to raster images, so that vector images can be interactively viewed by a user on demand.

SUMMARY OF THE DESCRIPTION

The present invention provides a method and system for streaming vector images, such as scaleable vector graphics (SVG), including maps and rich text documents. The method and system of the present invention can be implemented using a variety of software and hardware architectures, including inter-alia server-side rendering and client-side rendering, and is particularly advantageous for efficiently streaming vector images to wireless devices.

The present invention involves two stages of processing—a first stage in which a vector image is pre-processed into a tiled multi-dimensional data structure, and a second stage in which tile regions from the pre-processed image are used to interactively stream the vector image on demand.

The present invention is particularly useful for streaming rich text documents, e-mail attachments and maps to wireless devices.

Although vector objects themselves are resolution-independent, and can be rendered at arbitrary levels of resolution, the present invention allows the capability for resolution-dependent visibility of vector objects. Thus, a vector object, such as an annotation or fine detail within a map, may be prescribed to be visible only at selected levels of resolution.

There is thus provided in accordance with a preferred embodiment of the present invention a method for streaming vector images to wireless devices, including receiving a request from a wireless device for a portion of a vector image and a target display width and height, the vector image including a plurality of vector primitives, determining which of the vector primitives are positioned so as to overlap the requested rectangular portion, clipping the overlapping vector primitives with the portion, and transmitting the clipped vector primitives that overlap the portion.

There is further provided in accordance with a preferred embodiment of the present invention a method for streaming vector images to wireless devices, including receiving a request from a wireless device for a portion of a vector image and a target display width and height, the vector image comprising a plurality of vector primitives, determining, for each vector primitive that is positioned so as to overlap the requested portion, the clipped vector primitive when such vector primitive is clipped with the requested portion, further determining if the data required to specify the clipped vector primitives requires more bytes than a threshold byte size, and if said further determining is affirmative, then rasterizing the requested portion of the vector image to generate a raster image portion, and transmitting the raster image portion, else transmitting the clipped vector primitives.

There is yet further provided in accordance with a preferred embodiment of the present invention a system for streaming vector images to wireless devices, including a receiver for receiving a request from a wireless device for a portion of a vector image and a target display width and height, the vector image comprising a plurality of vector primitives, a graphics processor for (i) determining which of the vector primitives are positioned so as to overlap the requested portion, and (ii) clipping the overlapping vector primitives with the portion, and a transmitter for transmitting the clipped vector primitives that overlap the portion.

There is moreover provided in accordance with a preferred embodiment of the present invention a system for streaming vector images to wireless devices, including a receiver for receiving a request from a wireless device for a portion of a vector image and a target display width and height, the vector image comprising a plurality of vector primitives, a graphics processor coupled to said receiver for (i) determining, for each vector primitive that is positioned so as to overlap the requested portion, the clipped vector primitive when such vector primitive is clipped with the requested portion, (ii) further determining if the data required to specify the clipped vector primitives requires more bytes than a threshold byte size, and (iii) if the further determining is affirmative, then rasterizing the requested portion of the vector image to generate a raster image portion, and a transmitter coupled to said graphics processor for transmitting the raster image portion or the clipped vector images, based on whether or not said further determining is affirmative, respectively.

There is additionally provided in accordance with a preferred embodiment of the present invention a computer-readable storage medium storing program code for causing a computer to perform the steps of receiving a request from a wireless device for a portion of a vector image and a target display width and height, the vector image including a plurality of vector primitives, determining which of the vector primitives are positioned so as to overlap the requested portion, clipping a portion of the vector primitives with the portion, and transmitting the clipped vector primitives that overlap the portion.

There is further provided in accordance with a preferred embodiment of the present invention a computer-readable storage medium storing program code for causing a computer to perform the steps of receiving a request from a wireless device for a portion of a vector image and a target display width and height, the vector image comprising a plurality of vector primitives, determining, for each vector primitive that is positioned so as to overlap the requested portion, the clipped vector primitive when such vector primitive is clipped with the requested portion, further determining if the data required to specify the clipped vector primitives requires more bytes than a threshold byte size, and if said further determining is affirmative, then rasterizing the requested portion of the vector image to generate a raster image portion, and transmitting the raster image portion, else transmitting the clipped vector primitives.

There is yet further provided in accordance with a preferred embodiment of the present invention a method for pre-processing a vector image, including receiving data for a vector image, the vector image data including a list of descriptions of global vector objects that can be rasterized for display at arbitrary levels of resolution, for each local region from among a plurality of local rectangular regions of the vector image, the local rectangular regions being associated with levels of resolution, determining local vector objects that correspond to intersections of global vector objects with such local region, and for each local region from among the plurality of local rectangular regions, storing descriptions of its local vector objects within a computer memory.

There is moreover provided in accordance with a preferred embodiment of the present invention a method for pre-processing vector images, including receiving data for a plurality of vector images, the plurality of vector images corresponding to an animation sequence, and the data for each vector image including a list of descriptions of global vector objects that can be rasterized for display at arbitrary levels of resolution, for each local region from among a plurality of local rectangular regions of the first vector image, the local rectangular regions being associated with levels of resolution, determining local vector objects that correspond to intersections of global vector objects of the first vector image with such local region, recording hash values of the local vector objects within an indexed look-up table, storing the indexed look-up table within a computer memory, for at least one successive vector image after the first vector image, and for each local region from among the plurality of local rectangular regions, determining local vector objects that correspond to intersections of global vector objects of such successive vector image with such local region, determining which of the local vector objects for the successive vector image are already stored in the look-up table, for those local vector objects that are already stored in the look-up table, storing their look-up table index within a computer memory, and for those local vector objects that are not already stored in the look-up table, storing descriptions of the local vector objects within the computer memory.

There is additionally provided in accordance with a preferred embodiment of the present invention a system for pre-processing a vector image, including a vector image processor that pre-processes vector image data, the vector image data including a list of descriptions of global vector objects that can be rasterized for display at arbitrary levels of resolution, including a local vector object generator that determines, for each local region from among a plurality of local rectangular regions of the vector image, the local rectangular region being associated with levels of resolution, local vector objects that correspond to intersections of global vector objects with such local region, and a data recorder that stores descriptions of the local vector objects within a computer memory, for each local portion.

There is further provided in accordance with a preferred embodiment of the present invention a system for pre-processing vector images, including a vector image processor that pre-processes data for a plurality of vector images, the plurality of vector images corresponding to an animation sequence, and the data for each vector image including a list of descriptions of global vector objects that can be rasterized for display at arbitrary levels of resolution, a local vector object generator that (i) determines, for each local region from among a plurality of local rectangular regions of the first vector image, the local rectangular regions corresponding to levels of resolution, local vector objects that correspond to intersections of global vector objects of the first vector image with such local region, and (ii) determines, for at least one successive vector image after the first vector image, and for each local region from among the plurality of local rectangular regions, local vector objects that correspond to intersections of global vector objects of such successive vector image with such local region, a look-up table generator that records hash values of the local vector objects within an indexed look-up table, and a data recorder that (i) stores the indexed look-up table within a computer memory, (ii) determines which of the local vector objects for the successive vector image are already stored in the look-up table, (iii) for those local vector objects that are already stored in the look-up table, stores their look-up table index within a computer memory, and (iv) for those local vector objects that are not already stored in the look-up table, stores descriptions of the local vector objects within the computer memory.

There is yet further provided in accordance with a preferred embodiment of the present invention a method for streaming a vector image to a client computer, including accessing a pre-processed vector image that was generated from a vector image, the pre-processed vector image including a plurality of local rectangular regions and a plurality of local vector objects, each local vector object being associated with one of the local rectangular regions, receiving a request from a user of a client computer for a desired portion of the vector image, for display at a desired pixel display resolution, identifying at least one local rectangular region from among the plurality of local rectangular regions of the pre-processed vector image, which is appropriate for generating the desired region of the vector image at the desired display resolution, and transmitting the local vector objects associated with the at least one local rectangular region to the client computer.

There is moreover provided in accordance with a preferred embodiment of the present invention a method for streaming a vector image to a client computer, including accessing a pre-processed vector image that was generated from a vector image, the pre-processed vector image including a plurality of local rectangular regions and a plurality of local vector objects, each local vector object being associated with one of the local rectangular regions, receiving a request from a user of a client computer for a desired region of the vector image, for display at a desired pixel display resolution, identifying at least one local rectangular region from among the plurality of local rectangular regions of the pre-processed vector image, which is appropriate for generating the desired portion of the vector image at the desired display resolution, generating the desired portion of the vector image at the desired display resolution, from the local vector objects associated with the at least one local rectangular region, and transmitting the desired portion of the vector image to the client computer.

There is additionally provided in accordance with a preferred embodiment of the present invention a method for streaming a vector image to a client computer, including accessing a pre-processed vector image that was generated from a vector image, the pre-processed vector image including a plurality of local rectangular regions and a plurality of local vector objects, each local vector object being associated with one of the local rectangular regions, receiving a request from a user of a client computer designating at least one rectangular region, from among the plurality of local rectangular regions, and transmitting the local vector objects associated with the at least one local rectangular region to the client computer.

There is further provided in accordance with a preferred embodiment of the present invention a method for interactively viewing a vector image, including indicating a request for a desired portion of a vector image, for display at a specified resolution, determining local rectangular regions of a pre-processed vector image that was generated from the vector image, from among a plurality of local rectangular regions, that are appropriate for generating the desired portion of the vector image therefrom, wherein the pre-processed vector image includes a plurality of local rectangular regions and a plurality of local vector objects, each local vector object being associated with one of the local rectangular regions, requesting at least one rectangular region of the pre-processed vector image from a server computer, receiving local vector objects associated with the requested at least one rectangular region of the pre-processed vector image from the server computer; and generating the desired portion of the vector image using the received local vector objects.

There is yet further provided in accordance with a preferred embodiment of the present invention a system for streaming a vector image to a client computer, including a receiver that receives a request from a user of a client computer for a desired portion of a vector image, for display at a desired pixel display resolution, a vector image adapter that (i) accesses a pre-processed vector image that was generated from the vector image, the pre-processed vector image including a plurality of local rectangular regions and a plurality of local vector objects, each local vector object being associated with one of the local rectangular regions, and (ii) identifies at least one local rectangular region from among the plurality of local rectangular regions of the pre-processed vector image, which is appropriate for generating the desired portion of the vector image at the desired display resolution; and a transmitter that transmits the local vector objects associated with the at least one local rectangular region to the client computer.

There is moreover provided in accordance with a preferred embodiment of the present invention a system for streaming a vector image to a client computer, including a receiver that receives a request from a user of a client computer for a desired portion of a vector image, for display at a desired pixel display resolution, a vector image adapter that (i) accesses a pre-processed vector image that was generated from the vector image, the pre-processed vector image including a plurality of local rectangular regions and a plurality of local vector objects, each local vector object being associated with one of the local rectangular regions, and (ii) identifies at least one local rectangular region from among the plurality of local rectangular regions of the pre-processed vector image, which is appropriate for generating the desired portion of the vector image at the desired display resolution, a vector image processor that generates the desired portion of the vector image at the desired display resolution, from the local vector objects associated with the at least one local rectangular region; and a transmitter that transmits the desired portion of the vector image to the client computer.

There is additionally provided in accordance with a preferred embodiment of the present invention a system for streaming a vector image to a client computer, including a receiver that receives a request from a user of a client computer designating at least one rectangular region, from among a plurality of local rectangular regions, a vector image adaptor that accesses a pre-processed vector image that was generated from a vector image, the pre-processed vector image including a plurality of local rectangular regions and a plurality of local vector objects, each local vector object being associated with one of the local rectangular regions, and a transmitter that transmits the local vector objects associated with the at least one local rectangular region to the client computer.

There is further provided in accordance with a preferred embodiment of the present invention a system for interactively viewing a vector image, including a user interface that interprets a request for a desired portion of a vector image, for display at a specified resolution, a transmitter that requests at least one rectangular region of a pre-processed vector image from a server computer, the pre-processed vector image having been generated from the vector image, the pre-processed image including a plurality of local rectangular regions and a plurality of local vector objects, each local vector object being associated with one of the local rectangular regions, a receiver that receives local vector objects associated with the requested at least one rectangular region of the pre-processed vector image from the server computer, and a vector image processor that (i) determines local rectangular regions of the pre-processed vector image, from among the plurality of local rectangular regions, that are appropriate for generating the desired portion of the vector image therefrom; and (ii) generates the desired portion of the vector image using the received local vector objects.

There is yet further provided in accordance with a preferred embodiment of the present invention a computer-readable storage medium storing program code for causing a computer to perform the steps of receiving data for a vector image, the vector image data including a list of descriptions of global vector objects that can be rasterized for display at arbitrary levels of resolution, for each local region from among a plurality of local rectangular regions of the vector image, the local rectangular regions being associated with levels of resolution, determining local vector objects that correspond to intersections of global vector objects with such local region, and for each local region from among the plurality of local rectangular regions, storing descriptions of its local vector objects within a computer memory.

There is moreover provided in accordance with a preferred embodiment of the present invention a computer-readable storage medium storing program code for causing a computer to perform the steps of receiving data for a plurality of vector images, the plurality of vector images corresponding to an animation sequence, and the data for each vector image including a list of descriptions of global vector objects that can be rasterized for display at arbitrary levels of resolution, for each local region from among a plurality of local rectangular regions of the first vector image, the local rectangular regions being associated with levels of resolution, determining local vector objects that correspond to intersections of global vector objects of the first vector image with such local region, recording hash values of the local vector objects within an indexed look-up table, storing the indexed look-up table within a computer memory, for at least one successive vector image after the first vector image, and, for each local region from among the plurality of local rectangular portions, determining local vector objects that correspond to intersections of global vector objects of such successive vector image with such local region, determining which of the local vector objects for the successive vector image are already stored in the look-up table, for those local vector objects that are already stored in the look-up table, storing their look-up table index within a computer memory, and for those local vector objects that are not already stored in the look-up table, storing descriptions of the local vector objects within the computer memory.

There is yet further provided in accordance with a preferred embodiment of the present invention a computer-readable storage medium storing program code for causing a computer to perform the steps of accessing a pre-processed vector image that was generated from a vector image, the pre-processed vector image including a plurality of local rectangular regions and a plurality of local vector objects, each local vector object being associated with one of the local rectangular regions, receiving a request from a user of a client computer for a desired portion of the vector image, for display at a desired pixel display resolution, identifying at least one local rectangular region from among the plurality of local rectangular regions of the pre-processed vector image, which is appropriate for generating the desired region of the vector image at the desired display resolution, and transmitting the local vector objects associated with the at least one local rectangular region to the client computer.

There is moreover provided in accordance with a preferred embodiment of the present invention a computer-readable storage medium storing program code for causing a computer to perform the steps of accessing a pre-processed vector image that was generated from a vector image, the pre-processed vector image including a plurality of local rectangular regions and a plurality of local vector objects, each local vector object being associated with one of the local rectangular regions, receiving a request from a user of a client computer for a desired portion of the vector image, for display at a desired pixel display resolution, identifying at least one local rectangular region from among the plurality of local rectangular regions of the pre-processed vector image, which is appropriate for generating the desired portion of the vector image at the desired display resolution, generating the desired portion of the vector image at the desired display resolution, from the local vector objects associated with the at least one local rectangular region, and transmitting the desired portion of the vector image to the client computer.

There is additionally provided in accordance with a preferred embodiment of the present invention a computer-readable storage medium storing program code for causing a computer to perform the steps of accessing a pre-processed vector image that was generated from a vector image, the pre-processed vector image including a plurality of local rectangular regions and a plurality of local vector objects, each local vector object being associated with one of the local rectangular regions, receiving a request from a user of a client computer designating at least one rectangular region, from among the plurality of local rectangular regions, and transmitting the local vector objects associated with the at least one local rectangular region to the client computer.

There is further provided in accordance with a preferred embodiment of the present invention a computer-readable storage medium storing program code for causing a computer to perform the steps of indicating a request for a desired portion of a vector image, for display at a specified resolution, determining local rectangular regions of a pre-processed vector image that was generated from the vector image, from among a plurality of local rectangular regions, that are appropriate for generating the desired portion of the vector image therefrom, wherein the pre-processed vector image includes a plurality of local rectangular regions and a plurality of local vector objects, each local vector object being associated with one of the local rectangular regions, requesting at least one rectangular region of the pre-processed vector image from a server computer, receiving local vector objects associated with the requested at least one rectangular region of the pre-processed vector image from the server computer; and generating the desired portion of the vector image using the received local vector objects.

There is yet further provided in accordance with a preferred embodiment of the present invention a method for interactively viewing a vector animation sequence, including receiving an indexed look-up table that stores a plurality of local vector objects associated with tile regions of a first vector image, indicating a request for a desired portion of a second vector image, for display at a specified resolution, determining tile regions of a pre-processed vector image that was generated from the second vector image, from among a plurality of tile regions, that are appropriate for generating the desired portion of the second vector image therefrom, wherein the pre-processed vector image includes a plurality of tile regions and a plurality of local vector objects, each local vector object being associated with one of the tile regions, requesting at least one tile region of the pre-processed vector image from a server computer, receiving local vector objects and local vector object indices associated with the requested at least one tile region of the pre-processed vector image from the server computer, extracting local vector objects from the indexed look-up table according to the local vector object indices received from the server computer, and generating the desired portion of the second vector image using the received local vector objects and the extracted local vector objects.

There is moreover provided in accordance with a preferred embodiment of the present invention a system for interactively viewing a vector animation sequence, including a receiver that (i) receives an indexed look-up table that stores a plurality of local vector objects associated with tile regions of a first vector image, and (ii) receives local vector objects and local vector object indices associated with at least one requested tile region of a pre-processed vector image from a server computer, the pre-processed vector image being generated from a second vector image, and the pre-processed vector image including a plurality of tile regions and a plurality of local vector objects, each local vector object being associated with one of the tile regions, a vector image adapter that extracts local vector objects from the indexed look-up table according to local vector object indices received from the server computer, a user interface that indicates a request for a desired portion of the second vector image, for display at a specified resolution, a vector image processor that (i) determines tile regions of the pre-processed vector image that are appropriate for generating the desired portion of the second vector image therefrom, and (ii) generates the desired portion of the second vector image using the received local vector objects and the extracted local vector objects, and a transmitter that requests at least one tile region of the pre-processed vector image from the server computer.

There is additionally provided in accordance with a preferred embodiment of the present invention a computer-readable storage medium storing program code for causing a computer to perform the steps of receiving an indexed look-up table that stores a plurality of local vector objects associated with tile regions of a first vector image, indicating a request for a desired portion of a second vector image, for display at a specified resolution, determining tile regions of a pre-processed vector image that was generated from the second vector image, from among a plurality of tile regions, that are appropriate for generating the desired portion of the second vector image therefrom, wherein the pre-processed vector image includes a plurality of tile regions and a plurality of local vector objects, each local vector object being associated with one of the tile regions, requesting at least one tile region of the pre-processed vector image from a server computer, receiving local vector objects and local vector object indices associated with the requested at least one tile region of the pre-processed vector image from the server computer, extracting local vector objects from the indexed look-up table according to the local vector object indices received from the server computer, and generating the desired portion of the second vector image using the received local vector objects and the extracted local vector objects.

BRIEF DESCRIPTION OF THE DRAWINGS

The present invention will be more fully understood and appreciated from the following detailed description, taken in conjunction with the drawings in which.

DETAILED DESCRIPTION

Figure 1A:
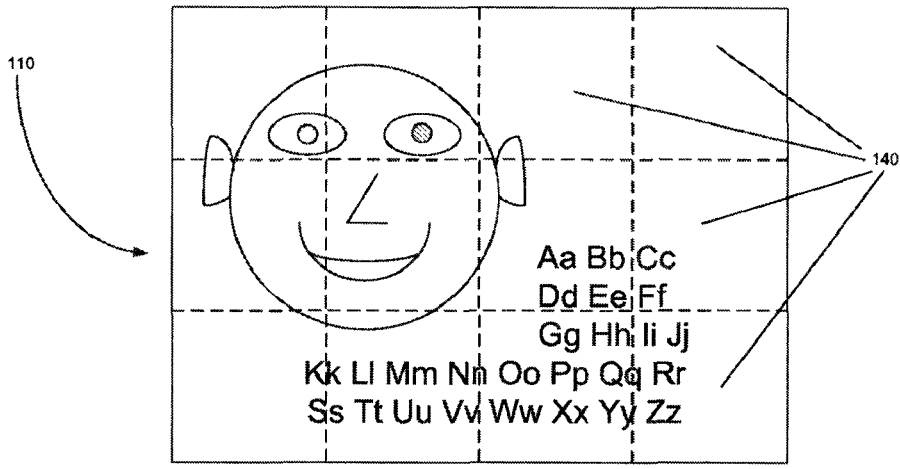
FIG. 1A is a simplified illustration of multi-resolution tile regions for a vector image, in accordance with a preferred embodiment of the present invention.
Figure 1A:
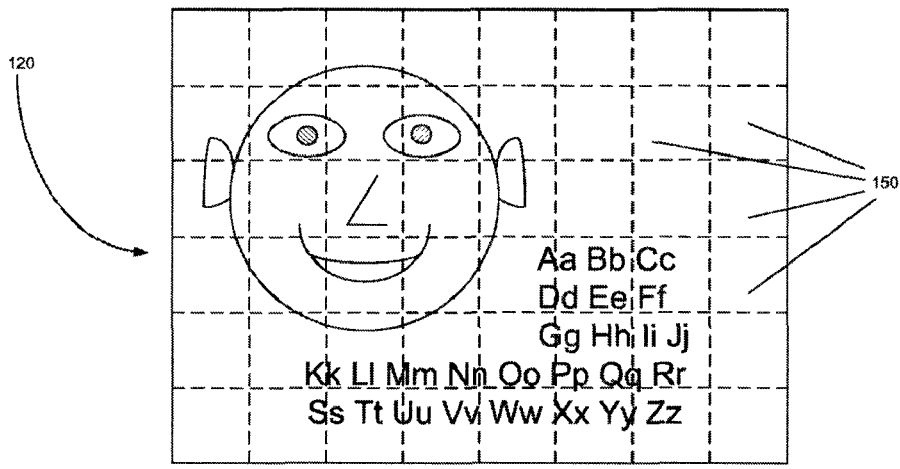
Figure 1A:
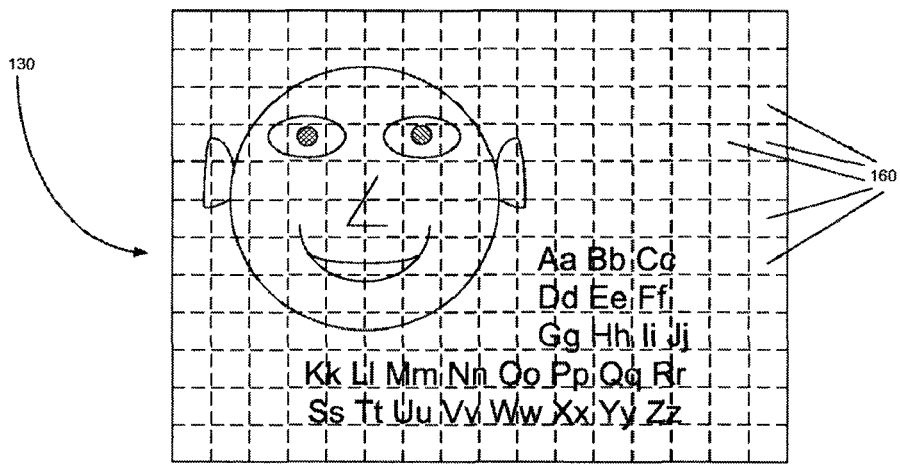

The present invention concerns a method and system for streaming vector images, such as scaleable vector graphics (SVG), from a server computer to a plurality of client computers.

The present invention is preferably implemented within a network of conventional client and server computers, wherein the server computers distribute media to the client computers. The server and client computers may be conventional computing devices, each including a central processing unit, memory units for storing programs and data, input devices including a mouse and keyboard, and an output display device. Preferably, the central processing unit, memory units, and device drivers for the mouse, keyboard and display are coupled communicatively together using a conventional data bus. Preferably the server computers run web server software, and the client computers run web browser software.

It may be appreciated from the description hereinbelow, that the present invention may be implemented advantageously within mobile computing devices including inter alia personal data assistants (PDAs), mobile media players and cell phones, provided that such devices include processing means, program and data storage means, and input and display means that inter-communicate.

The present invention involves two stages of processing; namely, a pre-processing stage, and an image streaming stage, as described in detail hereinbelow.

Pre-Processing

In accordance with a preferred embodiment of the present invention, vector images to be streamed are pre-processed into a tiled multi-resolution data structure. Specifically, multiple resolutions of an original vector image, encoded as a list of global vector objects, are generated, and each such resolution is partitioned into a lattice of rectangular tile regions. For example, a vector image may be generated at seven levels of pixel resolution, say (level 1) 200×300 pixels, (level 2) 400×600-pixels, (level 3) 800×1200 pixels, (level 4) 1600×2400 pixels, (level 5) 3200×4800 pixels, (level 6) 6400×9600 pixels, and (level 7) 12800×19200 pixels. Each such level of resolution is partitioned into adjacent tile regions of 100×100 pixels.

It may be appreciated that vector objects are generally resolution-independent. As such, they may be generated at any desired resolution. Thus, as distinct from a raster image, a vector image does not have a "true" resolution. Instead, if the dimensions of the vector image are normalized so that the image has a width and height of 1.0 unit, then each 100×100 tile region corresponds to a normalized rectangle relative to a 1.0×1.0 unit square. At level 1, each tile region has normalized dimensions of 0.5×0.3333333, and the full image includes a 2×3 array of such tile regions. At level 2, each tile region has normalized dimensions of 0.25×0.1666667, and the full image includes a 4×6 array of such tile regions. At level 7, each tile region has normalized dimensions of 0.0078125×0.0052083, and the full image includes a 128×192 array of such tile regions. It may be appreciated that as the resolution increases from level to level, each 100×100 pixel tile region encompasses a smaller and smaller portion of the full image. Each individual tile region corresponds to a specific level of resolution, and to a normalized sub-region of the unit square.

It may be appreciated that the number of levels of resolution, and the pixel dimensions of each level of resolution are arbitrary, and may be specified by parameters. Similarly, the size of a tile region may vary from one level of resolution to the next.

Preferably, each 100×100 pixel tile region is specified within a data structure as a list of local vector objects, determined by intersecting the vector objects from the original vector image, referred to as global vector objects, with the region corresponding to the tile region. That is, local vector objects associated with a tile region are generated by clipping global vector objects with the tile region. In general, some of the global vector objects from the original vector image may not intersect the tile region at all. Thus, each tile region is encoded as a list of its own local vector objects, which correspond to intersections of some of the global vector objects with the tile region.

At low levels of resolution, some of the local vector objects may reduce to within the size of a single pixel. In accordance with a preferred embodiment of the present invention, in such a case the local vector object is encoded as a single pixel within the tile region containing such pixel.

Similarly, as the levels of resolution get higher, some additional details may become visible, such as streets and roads within a map, or annotations. Conversely, as the levels of resolution get higher, some details may omitted, such as national boundaries, which do not need to be present within a map when the map is magnified into a local neighborhood level. In accordance with a preferred embodiment of the present invention, global vector objects may be designated to appear only at specified resolutions. Such global vector objects will be excluded from clipping for tile regions that correspond to non-designated levels of resolution, even if the global vector objects intersect with the tile region.

Furthermore, at high levels of resolution, it is possible that different global vector objects have identical intersections within a single tile region. Specifically, the intersections are considered identical if the local vector objects have the same attributes, including inter alia color, style and control points. In accordance with the present invention, duplicate local vector objects are eliminated.

Encoding vector objects as single pixels within a low resolution tile region, excluding vector objects from low resolutions tile regions that are specified not to be visible at such resolution, and eliminating duplicate intersections of vector objects, serve to "thin out" the vector object lists that encode individual tile regions, and reduce the overall size of the resulting tiled multi-resolution data structures.

Reference is now made to FIG. 1A, which is a simplified illustration of multi-resolution tile regions for a vector image, in accordance with a preferred embodiment of the present invention. Shown in FIG. 1A are three partitions, ranging from a coarse partition 110 to a finer partition 120 and to a yet finer partition 130. Each partition includes rectangular tile regions 140, 150 and 160 respectively. These rectangular regions are the tile regions referred to herein. By assigning pixel dimensions to tile regions, say 100×100 pixels, each tile region corresponds to a specific resolution for the vector image. Thus, tile regions 160 correspond to a global resolution that is twice the width and height of the global resolution for tile regions 150, and similarly tile regions 150 correspond to a global resolution with that is twice the width and height of the global region for tile regions 140. Specifically, if the tile regions 140, 150 and 160 are each 100×100 pixels, then the tile regions 140 correspond to a global resolution of 300×400 pixels, the tile regions 150 correspond to a global resolution of 600×800 pixels, and the tile regions 160 correspond to a global resolution of 1200×1600 pixels.

In accordance with a preferred embodiment of the present invention, one or more of the global vector objects may be specified so as to be visible only at specific levels of resolution. Although vector objects are inherently resolution-independent, and may be rendered at arbitrary levels of resolution, the present invention enables the capability of resolution-dependent visibility for vector objects.

Figure 1B:
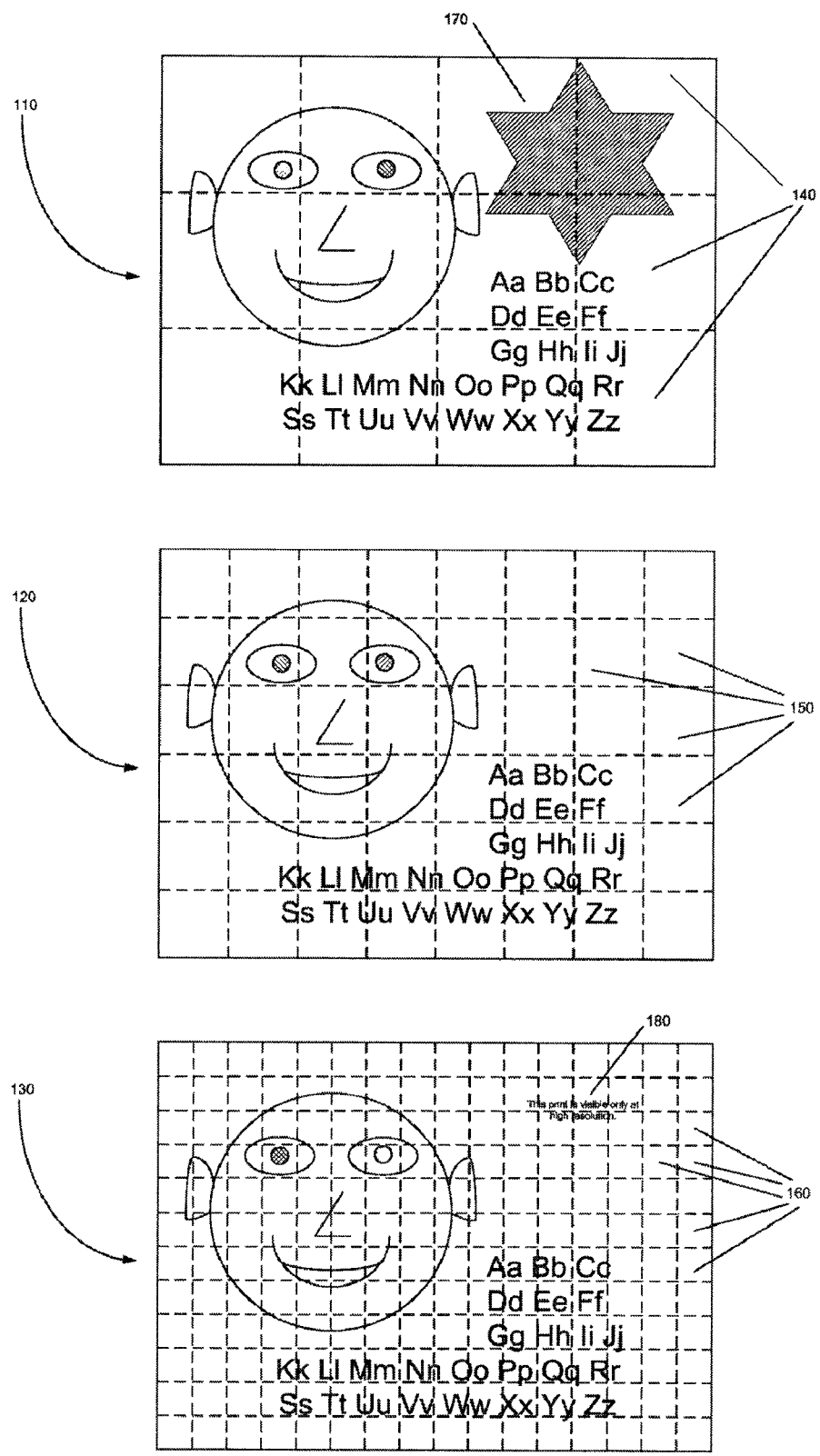
FIG. 1B is a variation of FIG. 1A that includes vector objects with resolution-dependent visibility, in accordance with a preferred embodiment of the present invention.

Reference is now made to FIG. 1B, which is a variation of FIG. 1A that includes vector objects with resolution-dependent visibility, in accordance with a preferred embodiment of the present invention. Specifically, a large star-shaped object 170 is only visible at the low resolution of partition 110, and the fine print annotation 180 is only visible at the high resolution of partition 130. It may be appreciated by those skilled in the art, that were it not for resolution-dependent visibility, the tile region data for each of the partitions 110, 120 and 130 would contain equivalent information.

Figure 2:
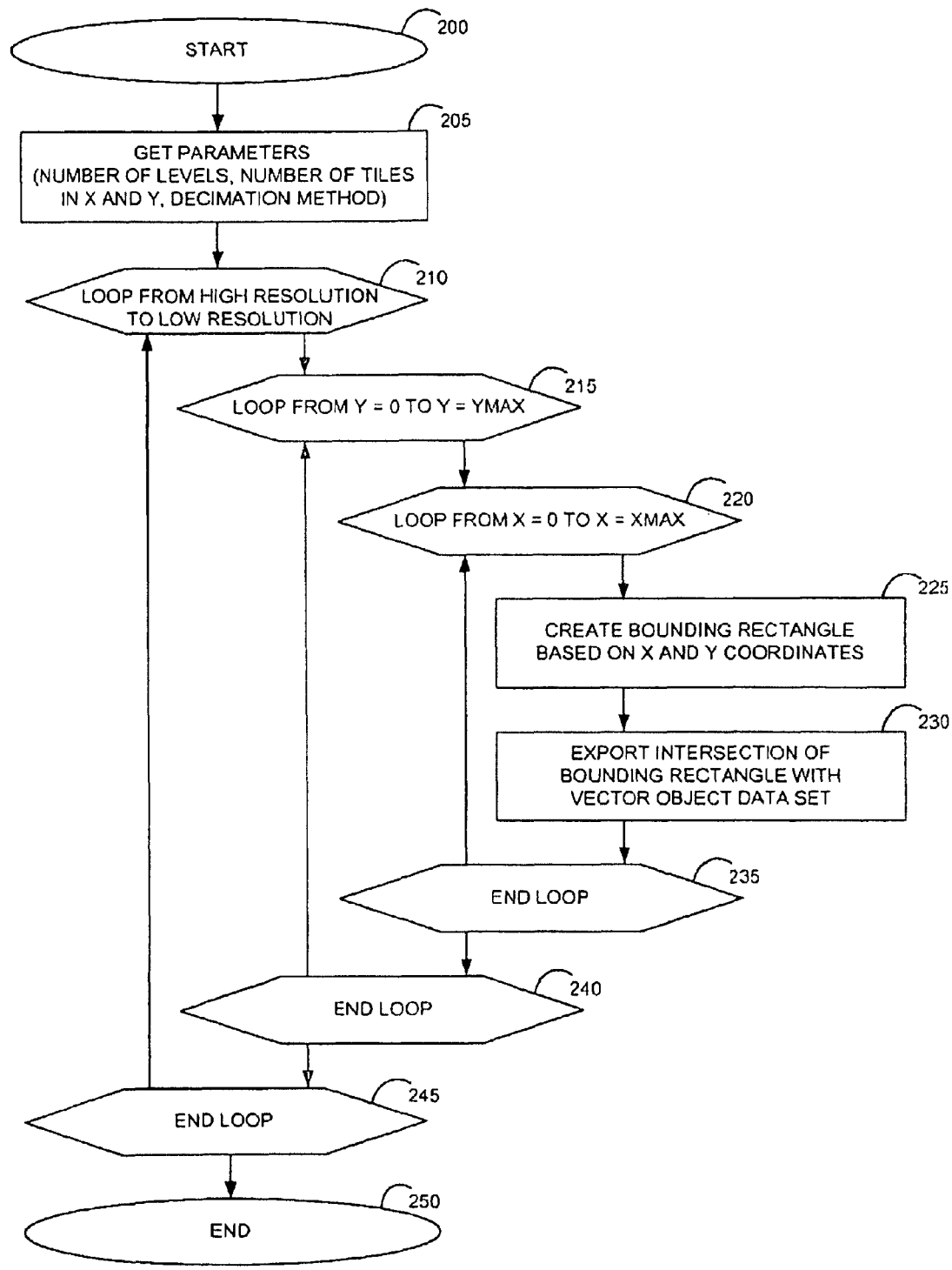
FIG. 2 is a simplified flowchart of a method for pre-processing vector images and generating tiled multi-resolution vector images therefrom, for streaming from a server to a client computer, in accordance with a preferred embodiment of the present invention.

Reference is now made to FIG. 2, which is a simplified flowchart of a method for pre-processing vector images and generating tiled multi-resolution vector images therefrom, for streaming from a server to a client computer, in accordance with a preferred embodiment of the present invention. The input for the flowchart is an original vector image, encoded as a list of global vector objects. As illustrated in FIG. 2, processing begins at step 200. At step 205 parameters that determine the number of levels of resolution, the pixel dimensions of the various levels of resolution, and the tile region size or sizes, are retrieved.

At steps 210, 215 and 220, the processing loops from highest to lowest level of resolution, and loops through the tile regions. For each tile region, a bounding rectangle corresponding to the position and size of the tile is determined at step 225, based on the pixel dimensions of the current level of resolution being processed. At step 230, the intersection of the global vector objects with the current bounding rectangle is determined, encoded as a local vector object, and exported into a local vector object list for the current tile. The loops cycle around at steps 235, 240 and 245, and processing ends at step 250. Preferably, the output of the flowchart is a data structure for a tiled multi-resolution image, including a list of local vector objects for each multi-resolution tile region, corresponding to the original vector image.

Figure 3:
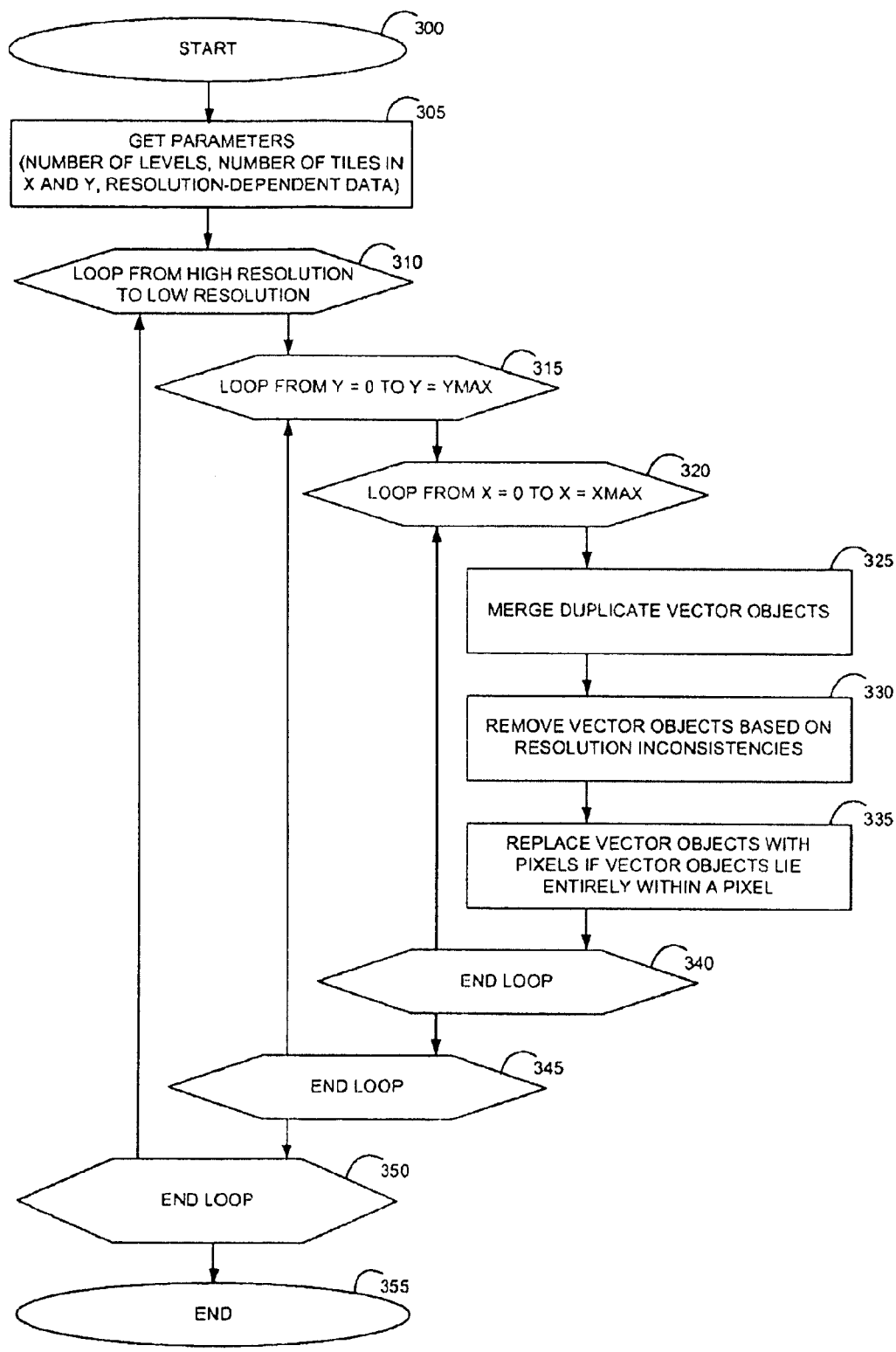
FIG. 3 is a simplified flowchart of a method for thinning multi-resolution tile data, for efficient streaming, in accordance with a preferred embodiment of the present invention.

Reference is now made to FIG. 3, which is a simplified flowchart of a method for thinning multi-resolution tile data, for efficient streaming, in accordance with a preferred embodiment of the present invention. The input for the flowchart of FIG. 3 is the output from the flowchart of FIG. 2; i.e., the data structure for the tiled multi-resolution image. The process of FIG. 3 loops through the tile regions at each level of resolution, and thins out the list of local vector objects used to encode the tiles.

Specifically, FIG. 3 starts at step 300. At step 305, parameters for the number of levels of resolution, the pixel dimensions of each level of resolution, and the tile region dimensions are retrieved. Additionally, parameters for resolution-dependent data are also retrieved at step 305. Such parameters specify the resolutions for which global vector objects are visible. Processing loops through the levels of resolution, and the tile regions within each level of resolution, at steps 310, 315 and 320. At step 325, duplicate local vector objects for the current tile region are eliminated. At step 330, local vector objects are removed if they were clipped from global vector objects that are designated as not being visible at the current level of resolution. At step 335, local vector objects that reduce to lie within a single pixel are replaced by a single pixel. The process of FIG. 3 cycles through the loops at steps 340, 345 and 350, and stops at step 355. Preferably, the output of the flowchart of FIG. 3 is a thinned out data structure for the tiled multi-resolution image that was processed.

Interactive Streaming

After the pre-processing stages of FIG. 2 and FIG. 3, the resulting tiled multi-resolution vector images may be streamed from a server computer to a plurality of client computers for interactive viewing. As with streaming of raster images, either server-side or client-side processing, or hybrid server-side and client-side processing may be implemented For server-side processing, a normalized region of interest, also referred to as a portion, within the unit square is requested at a specified pixel resolution, and the server preferably returns a single image formatted according to a specified format, such as SVG, corresponding to the request.

For client-side processing, one or more tile regions are requested, and the client performs the processing to assemble the individual tiles. Thus, the client may rasterize the tiles into raster image tiles, for display purposes.

As with raster image streaming, individual vector tiles may be cached for later retrieval within a current session, or within a later session.

Figure 4:
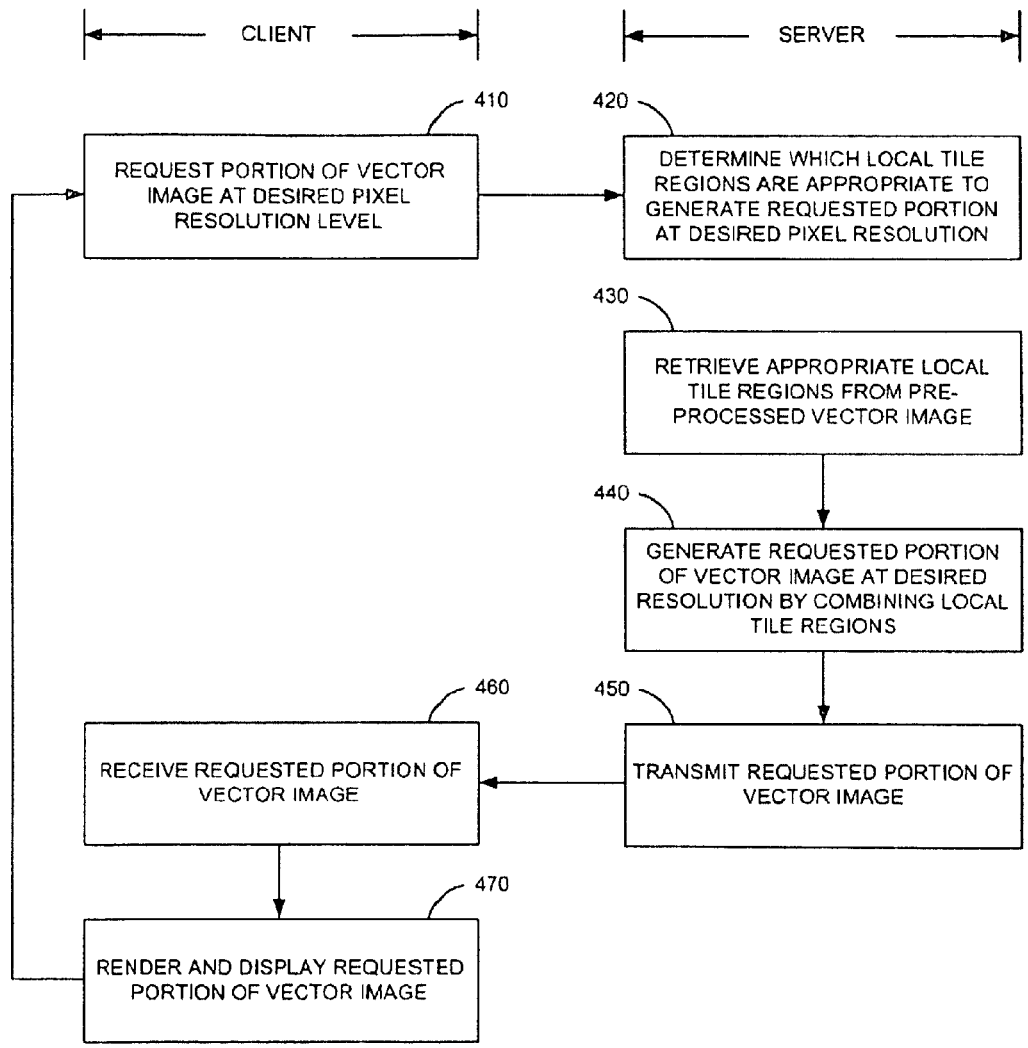
FIG. 4 is a simplified flowchart of a server-side implementation of vector image streaming, in accordance with a preferred embodiment of the present invention.

Reference is now made to FIG. 4, which is a simplified flowchart of a server-side implementation of vector image streaming, in accordance with a preferred embodiment of the present invention. The leftmost column of FIG. 4 describes steps performed by a client computer, which is interactively viewing a vector image. The rightmost column of FIG. 4 describes steps performed by a server computer, which is streaming vector image data to the client computer on demand.

The workflow shown in FIG. 4 is repetitive, and includes the basic mechanism of making an interactive request to view a portion of a vector image, preparing the requested portion and displaying it. After displaying the portion of the vector image, processing cycles back to request a different portion of the vector image. In a preferred embodiment of the present invention, each such request is entered into the client computer by a user interface that translates user actions into commands. For example, to issue a request for zooming into a vector image, the user may click on a portion of the displayed image to request a magnified view thereof, or may click on an icon of a magnifying glass, or may draw a rectangle around a portion of the displayed vector image to designate a region of interest, in order to magnify the image so that the region of interest is re-sized to fill the display area.

It is assumed in FIG. 4 that the vector image being streamed and interactively viewed was pre-processed into a tiled multi-dimensional data structure that includes local vector objects indexed according to local tile regions. Preferably, the pre-processing was performed according to the methodology described above with reference to FIGS. 2 and 3. However, it may be appreciated by those skilled in the art that such pre-processing may be performed on-the-fly, as portions of the vector image are being streamed.

At step 410 the client computer issues a request to the server computer for a region of interest, or portion, of a vector image at a desired pixel resolution; namely, the pixel resolution of the display window in which the vector image appears. Preferably, the request is made by a user of the client computer through a graphical user interface. At step 420 the server computer determines which local tile regions of the pre-processed vector image are necessary or appropriate for generating the requested portion of the vector image. At step 430 the server computer retrieves the relevant local tile data from the pre-processed vector image; namely, the local vector objects associated with relevant local tile regions. At step 440 the server computer combines the local tile data and generates the requested vector portion. In accordance with a preferred embodiment of the present invention, the requested vector image portion is formatted in a standard image format, such as scaleable vector graphics (SVG). Such an image format can be interpreted and processed by a client computer browser, without the need for supplemental client software.

At step 450 the server computer transmits the requested portion of the vector image in a standard image format. At step 460 the client computer receives the requested portion. At step 470 the client computer renders the requested portion, preferably using a standard web browser, and displays the portion on a computer monitor connected to the client computer. After viewing the displayed image portion, the user of the client computer can interactively request a different portion for viewing, and processing cycles back around to step 410.

Figure 5:
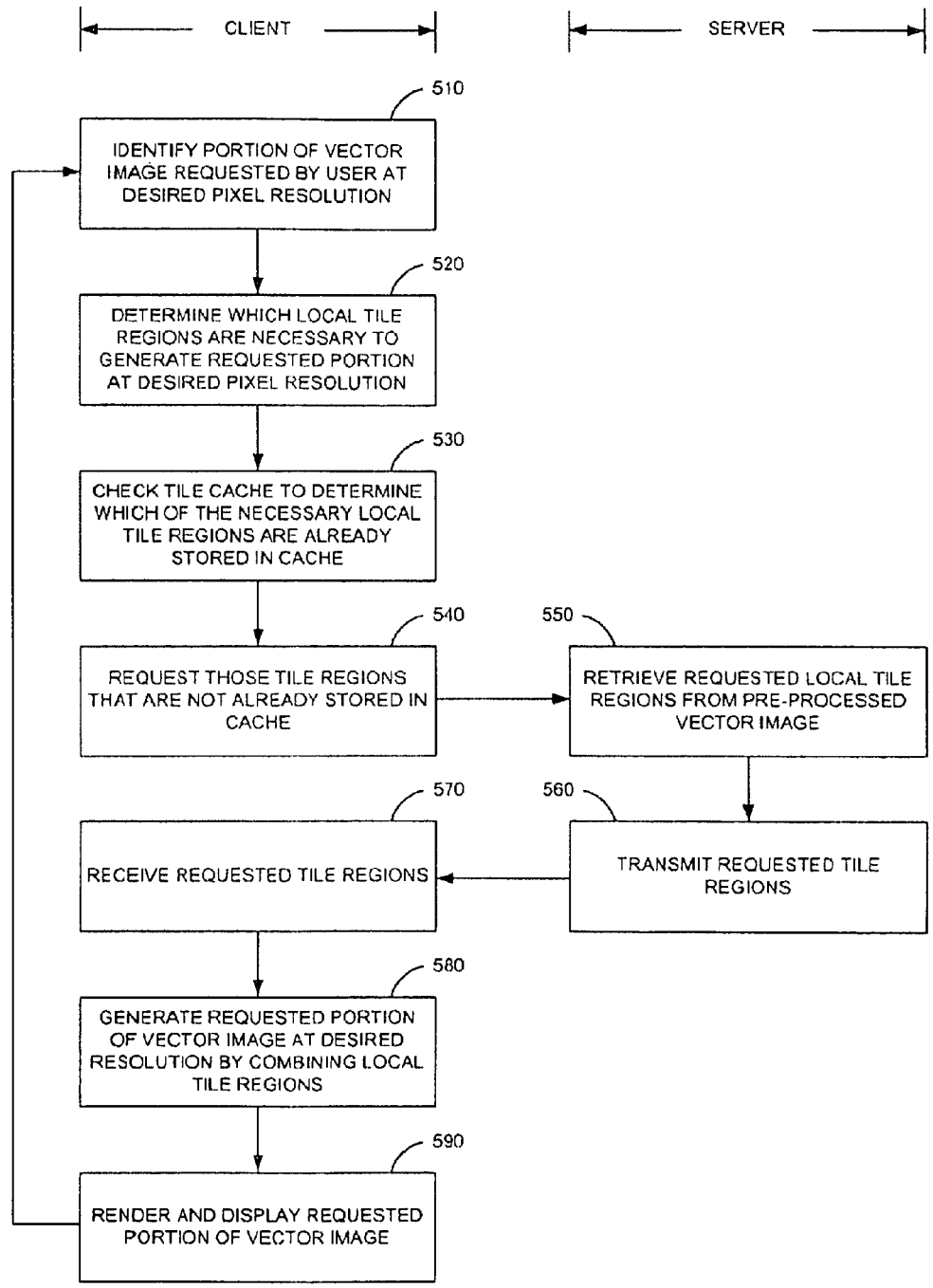
FIG. 5 is a simplified flowchart of a client-side implementation of vector streaming, in accordance with a preferred embodiment of the present invention.

Reference is now made to FIG. 5, which is a simplified flowchart of a client-side implementation of vector streaming, in accordance with a preferred embodiment of the present invention. As with FIG. 4, the leftmost column of FIG. 5 describes steps performed by a client computer, and the rightmost column of FIG. 5 describes steps performed by a server computer. As with FIG. 4, the workflow described in FIG. 5 is recurrent, and cycles around as a user repetitively requests different portions of a vector image for viewing. In comparison with FIG. 4, it may be seen that many of the image processing steps are located on the client side, instead of the server side, in FIG. 5.

As with the flowchart of FIG. 4, the flowchart of FIG. 5 also assumes that the vector image being interactively viewed by the user was pre-processed into a tiled multi-resolution vector image, as described above with reference to FIGS. 2 and 3. It is also assumed in FIG. 5 that the client computer has additional software to supplement a web browser, for performing the client-side steps of FIG. 5.

At step 510, the client computer identifies a portion of the vector image requested by a user for viewing at a desired pixel resolution; namely, the pixel resolution of the display area. Preferably, step 510 is performed through a user interface, which translates user actions, such as mouse and keyboard actions, into user requests. At step 520, the client computer determines which local tile regions of the pre-processed vector image are necessary or appropriate to generate the requested portion of the vector image at the desired resolution. In order for the client computer to be able to identify the relevant local tile regions, the software running on the client computer is preferably aware of the parameters for the pre-processed vector image, including inter alia the tile region dimensions and the resolution levels for the pre-processed vector image.

At step 530 the client computer checks its tile cache to see if some or all of the data for the relevant local tile regions is already stored in its tile cache. At step 540 the client computer requests that the server computer provide data for those local tile regions that are not resident in the client tile cache. At step 550 the server computer retrieves the requested local tile regions from the pre-processed vector image. At step 560 the server computer transmits the requested data for the tile regions to the client computer. In accordance with a preferred embodiment of the present invention, for the purpose of efficiency, server 560 bundles data for multiple tile regions within a single packet, which can be sent and unpacked within the overhead of a single network request.

At step 570 the client computer receives the data for the tile regions, and at step 580 the client computer combines the data to generate the requested portion of the vector image at the desired resolution. At step 590 the client computer renders and displays the requested portion. Thereafter, the user can interactively request to view a different portion of the vector image, and processing cycles back around to step 510.

Figure 6:
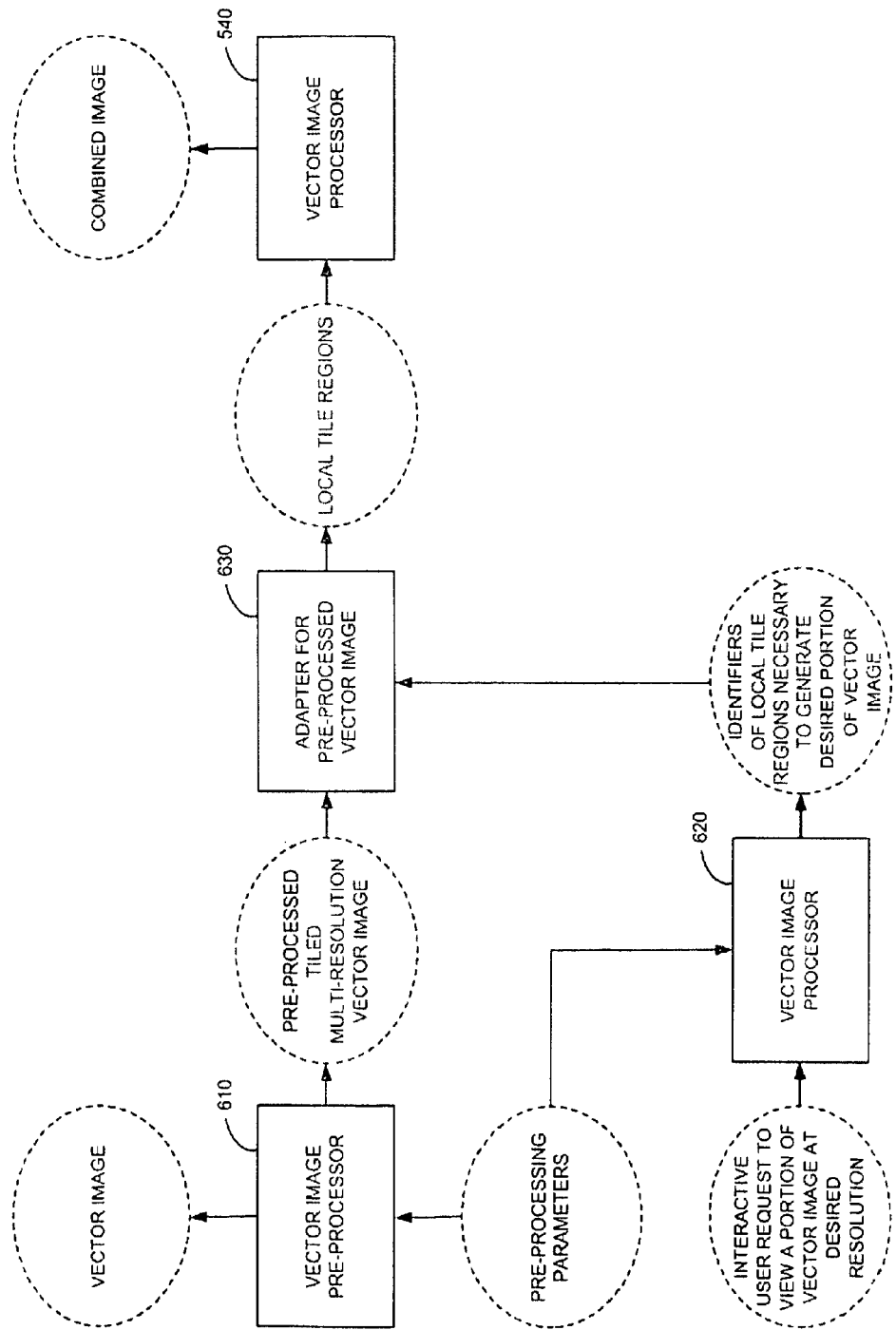
FIG. 6 is a simplified block diagram of the components of an image streaming system, in accordance with a preferred embodiment of the present invention.

Reference is now made to FIG. 6, which is a simplified block diagram of the components of an image streaming system, in accordance with a preferred embodiment of the present invention. Shown in FIG. 6 are the modules that comprise the basic vector image pre-processing and streaming mechanism. A vector image pre-processor 610 receives as input a vector image as input, such as a scalable vector graphics (SVG) image, and generates as output a tiled multi-resolution version of the vector image, stored as a data structure including inter alia local vector objects that are indexed according to local tile regions of the vector image, as described hereinabove. Vector image pre-processor 610 also receives as input pre-processing parameters including inter-alia dimensions of local rectangular tile regions and levels of resolution. The output of vector image pre-processor 610 includes inter alia local vector objects that correspond to global vector objects clipped with local tile regions. Additionally, if the vector image includes a rendering order then preferably the pre-processed vector image includes induced rendering vectors for local vector objects in each of the local tile regions.

A vector image processor 620 receives as input a user request for a portion of a vector image to be displayed at a desired resolution, and identifies as output which of the local tile regions of a pre-processed vector image are necessary or appropriate for fulfilling the user request. Vector image processor 620 also receives as input the parameters for the pre-processed vector image, including inter alia dimensions of local rectangular tile regions and levels of resolution.

A pre-processed vector image adapter 630 is used to interface with the pre-processed vector image. Vector image adapter 630 receives as input the pre-processed vector image, or one or more pointers thereto. Vector adapter 630 also receives as input one or more identifiers of local tile regions. Vector adapter 630 accesses the pre-processed vector image and retrieves the data associated with the local tile regions identified, including inter alia the vector objects associated with such local tile regions.

A vector image processor 640 receives as input data associated with one or more local tile regions, and generates as output a combined image at the pixel resolution desired by the user. Preferably, the output of vector image processor 640 is in a standard vector format, such as SVG, or a standard raster format, such as JPEG. A standard web browser is thus able to render the combined image without the need for supplemental software.

It is apparent from FIG. 6 that vector image processor 620 and vector image processor 640 may reside either on a client computer or on a server computer. For a server-side implementation, all of the modules shown in FIG. 6 reside on a server computer. A client computer merely has to issue a request to view a desired portion of the vector image at a desired resolution, and the processing in modules 620, 630 and 640 is all carried out at the server computer. Conversely, for a client-side implementation, modules 620 and 640 reside on the client computer. The server computer merely has to receive a request that includes identifiers of one or more local tile regions, retrieve data associated with the identified tile regions using adapter 630, and send the retrieved data to the client computer. For a hybrid server-side and client-side implementation, vector processor 620 resides on the server computer and vector processor 640 resides on the client computer. I.e., the client computer issues a request to the server computer for a portion of the vector image at a desired resolution, the server computer determines which tile regions are appropriate and sends the local vector object data associated with such tile regions to the client, and the client combines the local vector object data into the requested portion of the vector image.

The present invention has widespread application to streaming of e-mail attachments to wireless devices in a rich format, including inter alia rich text documents, spreadsheets, diagrams and presentations.

In reading the above description, persons skilled in the art will realize that there are many apparent variations that can be applied to the methods and systems described. Thus the present invention can be implemented without pre-processing vector images. Instead, when a user requests a desired portion of a vector image, local vector objects can be generated dynamically on-the-fly by clipping global vector objects with appropriate regions.

The present invention can also be used for interactively viewing non-rectangular portions of images, including inter alia polygonal, circular and elliptical portions. For example, a user can navigate a map that is displayed within an elliptical-shaped border, panning in various directions and zooming in and out, all within the border.

The present invention also has application to streaming of vector animations. Specifically, when the present invention is used to stream vector images, such as SVG documents, as frames for an animation, the thinning out process preferably also removes vectors that are present within the same tile region, for a plurality of frames. Indeed, at high levels of resolution, it is expected that vector objects within the same tile region are identically present within a sequence of frames. Thus by avoiding re-sending of the same vector objects for successive frames, considerable performance gains are achieved.

In order to efficiently determine whether a vector object within a tile of a current animation frame is present within the preceding frame, the present invention preferably stores hash values for the individual vector objects within the lists of vector objects for each tile region of a first animation frame, in a look-up table. I.e., the look-up table stores hash keys for each of the vector objects of each of the multi-resolution tile regions, for the first frame of the animation. For each successive frame, whenever a vector object within a tile region is already present within the look-up table, such vector object is encoded as an index into the look-up table, instead of being encoded as an independent vector object.

Figure 7:
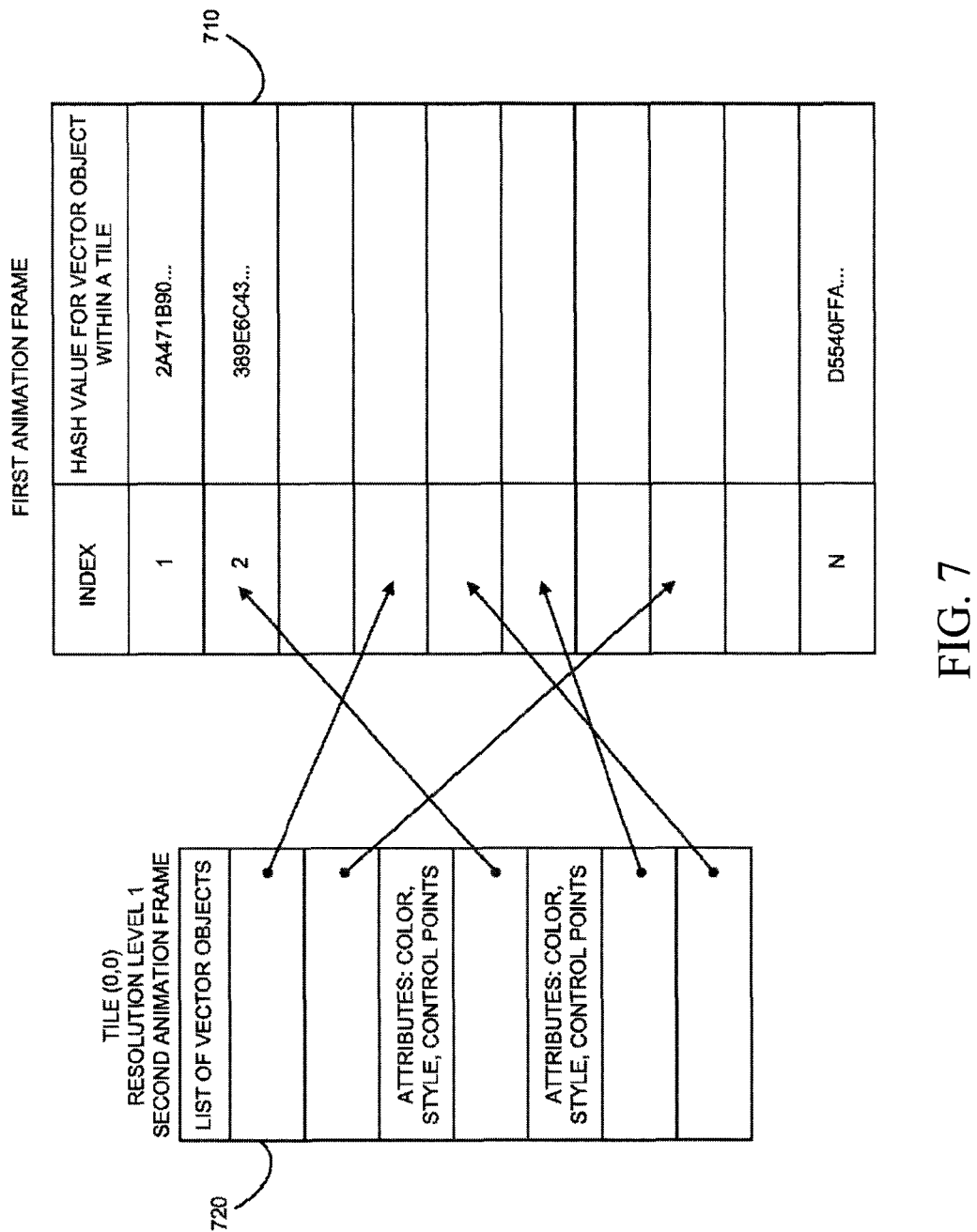
FIG. 7 is a simplified diagram illustrating a data structure for storing local vector objects within multi-resolution tile regions, for efficient use in streaming vector animations, in accordance with a preferred embodiment of the present invention.

Reference is now made to FIG. 7, which is a simplified diagram illustrating a data structure for storing local vector objects within multi-resolution tiles, for efficient use in streaming vector animations, in accordance with a preferred embodiment of the present invention. Shown in FIG. 7 is a look-up table 710, which stores hash values for local vector objects associated with tile regions. Preferably, look-up table 710 is constructed for the first frame of a sequence of frames within a vector animation. Also shown in FIG. 7 is a list 720 of local vector objects for a tile region within a second frame of the vector animation. Each of the local vector objects is stored either conventionally in terms of attributes, including inter alia color, style and control points, or in terms of an index to look-up table 710. The latter representation is used for vector objects of the second frame that have identical counterparts within the first frame.

After being populated with hash values, look-up table 710 is transmitted to a client computer that is interactively viewing the animation. Thereafter, when the client computer receives one or more tiles encoded as a list of local vector objects, such as list 720, the client is able to retrieve the attributes of those local vector objects encoded as table indices, by extracting them from the look-up table.

For relatively long animation sequences, look-up table 710 can be re-generated for key frames, similar to the way key frames are used in MPEG encoders. Use of key frames serves to keep look-up table 710 current, so that local vector objects of successive frames are likely to be already stored in the look-up table. Use of key frames also serves to enable a user to view the animation sequence without starting from the first frame.

In the foregoing specification, the invention has been described with reference to specific exemplary embodiments thereof. It will, however, be evident that various modifications and changes may be made to the specific exemplary embodiments without departing from the broader spirit and scope of the invention as set forth in the appended claims. Accordingly, the specification and drawings are to be regarded in an illustrative rather than a restrictive sense.

What is claimed is:

1. A computer processing-based method for pre-processing a vector image, comprising:

receiving, by a computer, data for a vector image, the vector image data including a list of descriptions of global vector objects that can be rasterized for display at arbitrary levels of resolution;

for each local region from among a plurality of local rectangular regions of the vector image, the local rectangular regions being associated with levels of resolution, determining, by the computer, local vector objects that correspond to intersections of global vector objects with such local region;

specifying, by the computer, a local vector object of a local rectangular region as a single pixel if the local vector object is confined within a single pixel for the level of resolution corresponding to the local rectangular region; and for each local region from among the plurality of local rectangular regions, storing, by the computer, descriptions of its local vector objects within a computer memory, wherein at least one of the descriptions specifies a local vector object as a single pixel if the local vector object is confined within a single pixel for the level of resolution corresponding to the local rectangular region.

2. The method of claim 1 wherein the plurality of local rectangular regions correspond to tiles within partitions of an image, for multiple partitions ranging from a relatively fine to a relatively coarse partition, each partition corresponding to a level of resolution.

3. The method of claim 2 wherein global vector objects are specified in terms of attributes, the attributes including an optional designator for levels of resolution at which a global vector object should be visible within the vector image, and wherein the local vector objects for a local rectangular portion include only intersections of those global vector objects that are to be visible at the level of resolution corresponding to the local rectangular region.

4. The method of claim 1 wherein global vector objects and local vector objects are specified in terms of attributes, the attributes including inter alia a color, a style and at least one control point.

5. The method of claim 1 further comprising eliminating, by the computer, duplicate local vector objects prior to said storing.

6. The method of claim 1 wherein the vector image is a document.

7. The method of claim 1 wherein the vector image is a map.

8. A computer processing-based method for pre-processing vector images, comprising:
    receiving, by a computer, data for a plurality of vector images, the plurality of vector images corresponding to an animation sequence, and the data for each vector image including a list of descriptions of global vector objects that can be rasterized for display at arbitrary levels of resolution;
    for each local region from among a plurality of local rectangular regions of the first vector image, the local rectangular regions being associated with levels of resolution, determining, by the computer, local vector objects that correspond to intersections of global vector objects of the first vector image with such local region;
    recording, by the computer, hash values of the local vector objects within an indexed look-up table;
    storing, by the computer, the indexed look-up table within a computer memory;
    for at least one successive vector image after the first vector image, and for each local region from among the plurality of local rectangular regions, determining, by the computer, local vector objects that correspond to intersections of global vector objects of such successive vector image with such local region;
    specifying, by the computer, a local vector object of a local rectangular region as a single pixel if the local vector object is confined within a single pixel for the level of resolution corresponding to the local rectangular region;
    determining, by the computer, which of the local vector objects for the successive vector image are already stored in the look-up table;
    for those local vector objects that are already stored in the look-up table, storing, by the computer, their look-up table index within a computer memory; and
    for those local vector objects that are not already stored in the look-up table, storing, by the computer, descriptions of the local vector objects within the computer memory, wherein at least one of the descriptions specifies a local vector object as a single pixel if the local vector object is confined within a single pixel for the level of resolution corresponding to the local rectangular region.

9. The method of claim 8 further comprising periodically updating, by the computer, the indexed look-up table for vector images designated as key images.

10. A system for pre-processing a vector image, comprising:
    a vector image processor that pre-processes vector image data, the vector image data including a list of descriptions of global vector objects that can be rasterized for display at arbitrary levels of resolution, comprising:
    a local vector object generator that determines, for each local region from among a plurality of local rectangular regions of the vector image, the local rectangular region being associated with levels of resolution, local vector objects that correspond to intersections of global vector objects with such local region, and that specifies a local vector object of a local rectangular region as a single pixel if the local vector object is confined within a single pixel for the level of resolution corresponding to the local rectangular region; and
    a data recorder that stores descriptions of the local vector objects within a computer memory, for each local portion, wherein at least one of the descriptions of a local vector object is stored as a single pixel if the local vector object is confined within a single pixel for the level of resolution corresponding to the local rectangular region.

11. The system of claim 10 wherein the plurality of local rectangular regions correspond to tiles within a partition of an image, for multiple partitions ranging from a relatively fine to a relatively coarse partition, each partition corresponding to a level of resolution.

12. The system of claim 11 wherein global vector objects are specified in terms of attributes, the attributes including an optional designator for levels of resolution at which a global vector object should be visible within the vector image, and wherein the local vector objects for a local rectangular region include only intersections of those global vector objects that are to be visible at the level of resolution corresponding to the local rectangular region.

13. The system of claim 10 wherein global vector objects and local vector objects are specified in terms of attributes, the attributes including inter alia a color, a style and at least one control point.

14. The system of claim 10 wherein said data recorder eliminates duplicate local vector objects prior to said storing.

15. The system of claim 10 wherein the vector image is a document.

16. The system of claim 10 wherein the vector image is a map.

17. A system for pre-processing vector images, comprising:
    a vector image processor that pre-processes data for a plurality of vector images, the plurality of vector images corresponding to an animation sequence, and the data for each vector image including a list of descriptions of global vector objects that can be rasterized for display at arbitrary levels of resolution;
    a local vector object generator that:
        (i) determines, for each local region from among a plurality of local rectangular regions of the first vector image, the local rectangular regions corresponding to levels of resolution, local vector objects that correspond to intersections of global vector objects of the first vector image with such local region;

(ii) determines, for at least one successive vector image after the first vector image, and for each local region from among the plurality of local rectangular regions, local vector objects that correspond to intersections of global vector objects of such successive vector image with such local region; and (iii) specifies a local vector object of a local rectangular region as a single pixel if the local vector object is confined within a single pixel for the level of resolution corresponding to the local rectangular region;

a look-up table generator that records hash values of the local vector objects within an indexed look-up table; and a data recorder that:
(i) stores the indexed look-up table within a computer memory;
(ii) determines which of the local vector objects for the successive vector image are already stored in the look-up table;
(iii) for those local vector objects that are already stored in the look-up table, stores their look-up table index within a computer memory; and
(iv) for those local vector objects that are not already stored in the look-up table, stores descriptions of the local vector objects within the computer memory, wherein at least one of the descriptions of a local vector object is stored as a single pixel if the local vector object is confined within a single pixel for the level of resolution corresponding to the local rectangular region.

18. The system of claim 17 further wherein said local vector object generator and said look-up table generator periodically update the indexed look-up table for vector images designated as key images.

19. A non-transitory computer-readable storage medium storing program code for causing a computer to perform the steps of:

receiving data for a vector image, the vector image data including a list of descriptions of global vector objects that can be rasterized for display at arbitrary levels of resolution;

for each local region from among a plurality of local rectangular regions of the vector image, the local rectangular regions being associated with levels of resolution, determining local vector objects that correspond to intersections of global vector objects with such local region;

specifying a local vector object of a local rectangular region as a single pixel if the local vector object is confined within a single pixel for the level of resolution corresponding to the local rectangular region; and for each local region from among the plurality of local rectangular regions, storing descriptions of its local vector objects within a computer memory, wherein at least one of the descriptions specifies a local vector object as a single pixel if the local vector object is confined within a single pixel for the level of resolution corresponding to the local rectangular region.

20. A non-transitory computer-readable storage medium storing program code for causing a computer to perform the steps of:

receiving data for a plurality of vector images, the plurality of vector images corresponding to an animation sequence, and the data for each vector image including a list of descriptions of global vector objects that can be rasterized for display at arbitrary levels of resolution;

for each local region from among a plurality of local rectangular regions of the first vector image, the local rectangular regions being associated with levels of resolution, determining local vector objects that correspond to intersections of global vector objects of the first vector image with such local portion;

specifying a local vector object of a local rectangular region as a single pixel if the local vector object is confined within a single pixel for the level of resolution corresponding to the local rectangular region;

recording hash values of the local vector objects within an indexed look-up table;

storing the indexed look-up table within a computer memory;

for at least one successive vector image after the first vector image, and for each local region from among the plurality of local rectangular regions, determining local vector objects that correspond to intersections of global vector objects of such successive vector image with such local region;

determining which of the local vector objects for the successive vector image are already stored in the look-up table;

for those local vector objects that are already stored in the look-up table, storing their look-up table index within a computer memory; and for those local vector objects that are not already stored in the look-up table, storing descriptions of the local vector objects within the computer memory, wherein at least one of the descriptions specifies a local vector object as a single pixel if the local vector object is confined within a single pixel for the level of resolution corresponding to the local rectangular region.

* * * * *